(No Model.)
J. A. MILLER.
TOASTER OR BROILER.
No. 523,127.          Patented July 17, 1894.
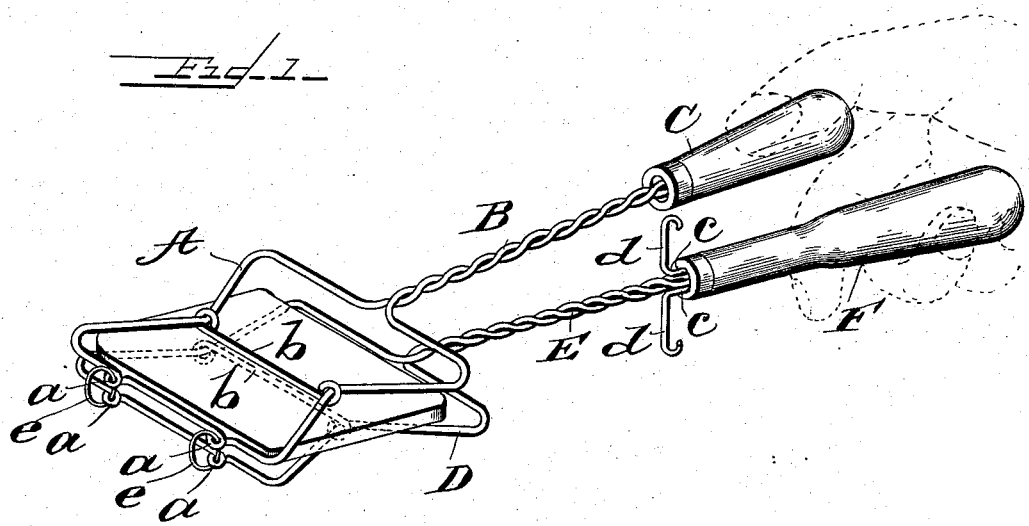
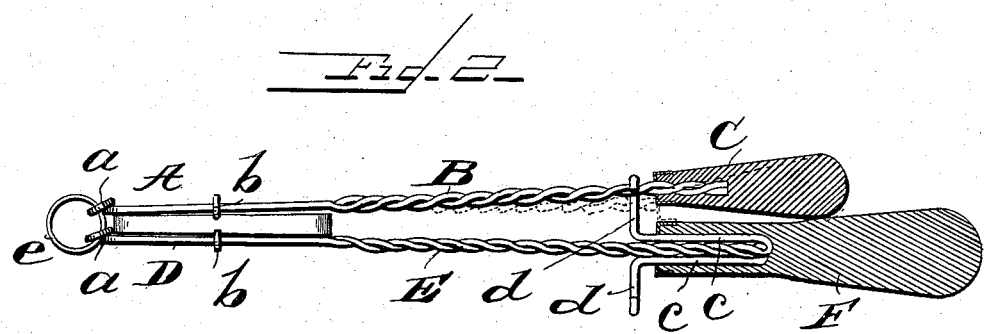
Witnesses
G. A. Tauberschmidt.
D. W. Reinohl.
Inventor
John A. Miller
By D. L. Reinohl
Attorney

UNITED STATES PATENT OFFICE.

JOHN A. MILLER, OF LEBANON, PENNSYLVANIA.

TOASTER OR BROILER.

SPECIFICATION forming part of Letters Patent No. 523,127, dated July 17, 1894.

Application filed December 28, 1893. Serial No. 495,005. (No model.)

*To all whom it may concern:*

Be it known that I, JOHN A. MILLER, a citizen of the United States, residing at Lebanon, in the county of Lebanon and State of Pennsylvania, have invented certain new and useful Improvements in Toasters or Broilers; and I do hereby declare the following to be a full, clear, and exact description of the invention, such as will enable others skilled in the art to which it appertains to make and use same.

My present invention relates to toasters and broilers and has for its object certain improvements in construction which will be fully disclosed in the following specification and claim.

In the accompanying drawings which form part of this specification Figure 1 is a perspective of my invention, and Fig. 2 a side elevation partly in section.

Reference being had to the drawings and the letters thereon, A indicates a frame provided with a twisted shank B and eyes $a\ a$ formed in the front end of the frames, the frame, the shank and the eyes being formed of a continuous piece of wire, and on the end of the shank is a handle C, of wood or other suitable non-conducting material. The frame is strengthened or stiffened by a transverse bar $b$ which engages both sides of the frame.

D, indicates a frame like the one just described, having a twisted shank E which terminates with two forwardly bent wires $c\ c$ formed into vertical hooks $d\ d$ which are bent at right angles to the plane of the shank and are designed to engage the shank B of the frame A and clamp an article of food such as a piece of bread to be toasted or a steak to be broiled between the frames A and D. The shank E is also provided with a handle F, which is considerably longer than the handle C, and is designed to be used for holding the toaster and broiler while in use.

The handle C rests upon the handle F at about its longitudinal median line and the inner end of the handle C is pressed down to spring the shank B into engagement with the hook $d$ on either side according to the way in which the frames have been brought together, as they are reversible, and the hook not in use may be used as a rest or support for the toaster and broiler.

The shanks being secured together by the springing of B into the hook, they cannot become separated or the article held between the frames dislodged by accident, as the shank B must be forcibly depressed to engage and disengage the hook. The several positions of the shank being shown in full and in dotted lines in Fig. 2.

The outer ends of the frames A and D are secured together by links or rings $e\ e$ which engage the eyes $a\ a$ in the frame.

The toaster thus constructed is light and easily manipulated, the locking of the shanks of the frames together being accomplished with one hand.

Having thus fully described my invention, what I claim is—

A toaster and broiler comprising a frame having a shank terminating in a hook integral therewith and bent at a right angle to the plane of the shank, and provided with a handle, and another frame having a shank provided with a short handle constructed to bear upon the handle of the first frame and said shank being constructed and adapted to be sprung into engagement with said hook.

In testimony whereof I affix my signature in presence of two witnesses.

JOHN A. MILLER.

Witnesses:
 C. R. LANTZ,
 CYRUS J. MILLER.